(12) United States Patent
Charpentier et al.

(10) Patent No.: US 7,298,317 B2
(45) Date of Patent: Nov. 20, 2007

(54) GAIN COMPENSATION IN AN ULTRA-WIDEBAND TRANSCEIVER

(75) Inventors: Albert J. Charpentier, Malvern, PA (US); Gopalakrishna K. Bhat, North Wales, PA (US)

(73) Assignee: Intellifit Corporation, Horsham, PA (US)

( * ) Notice: Subject to any disclaimer, the term of this patent is extended or adjusted under 35 U.S.C. 154(b) by 203 days.

(21) Appl. No.: 11/280,510

(22) Filed: Nov. 16, 2005

(65) Prior Publication Data

US 2007/0109180 A1    May 17, 2007

(51) Int. Cl.
*G01S 7/40* (2006.01)
(52) U.S. Cl. .................. 342/174; 342/195; 342/91; 342/92; 342/194
(58) Field of Classification Search ................ 342/165, 342/173, 174, 194, 195, 91–94
See application file for complete search history.

(56) References Cited

U.S. PATENT DOCUMENTS

| 5,073,782 | A | 12/1991 | Huguenin et al. | 342/179 |
|---|---|---|---|---|
| 5,455,590 | A | 10/1995 | Collins et al. | 342/179 |
| 5,557,283 | A | 9/1996 | Sheen et al. | 342/179 |
| 5,573,012 | A | 11/1996 | McEwan | 128/782 |
| 5,859,609 | A | 1/1999 | Sheen et al. | 342/179 |
| 6,507,309 | B2 | 1/2003 | McMakin et al. | 342/22 |
| 6,665,577 | B2 | 12/2003 | Onyshkevych et al. | 700/130 |
| 2007/0003078 | A1* | 1/2007 | Escott et al. | 381/107 |
| 2007/0047621 | A1* | 3/2007 | Barnes et al. | 375/130 |
| 2007/0049234 | A1* | 3/2007 | McCorkle et al. | 455/313 |
| 2007/0076818 | A1* | 4/2007 | Barnes et al. | 375/316 |
| 2007/0109180 | A1* | 5/2007 | Charpentier et al. | 342/174 |

OTHER PUBLICATIONS

"A 0.1-23-GHz SiGe BiCMOS analog multiplier and mixer based on attenuation-compensation technique", Ming-Da Tsai; Chin-Shen Lin; Chi-Hsueh Wang; Chun-Hsien Lien; Huei Wang Radio Frequency Integrated Circuits (RFIC) Symposium, 2004. Digest of Papers. IEEE Jun. 6-8, 2004 Ps: 417-420.*

"3-D Holographic Body Scanner for Better Airport Security",*Energy Science News*, www.pml.gov/energyscience/01-02/art1.htm, 4 pages.

* cited by examiner

*Primary Examiner*—John B Sotomayor
(74) *Attorney, Agent, or Firm*—Woodcock Washburn LLP; Jerome G. Schaefer

(57) ABSTRACT

A circuit for providing gain compensation to a swept frequency response in an ultra-wideband system includes using a variable amplitude IF signal into a gigahertz mixer to control the amplitude of a ultra-wideband transmitter. The variable amplitude IF signal is generated by a multiplier receiving a fixed-level intermediate frequency (IF) signal and a gain control input. The gain control input being provided by an digital-to-analog converter controlled by gain control values in a look-up table. The values of the look-up table are generated by inverting, normalizing, and scaling the uncompensated gain response of the ultra-wideband system. The gain compensated system produces a substantially flat amplitude response at the output of a quadrature receiver.

22 Claims, 7 Drawing Sheets

GAIN COMPENSATION IN AN ULTRA-WIDEBAND TRANSCEIVER

TECHNICAL FIELD

This invention relates to gain compensation in ultra-wideband transceivers. Specifically, this invention relates to a method to compensate for non-uniform frequency response in a transmitter/receiver system where a substantially uniform signal return level is desirable.

BACKGROUND

Some scanning systems which determine dimensional and topographical information from a clothed individual use ultra-wideband electromagnetic radiation. These systems can non-intrusively determine the physical measurements of an individual and render a display image. U.S. Pat. No. 6,507,309 entitled Interrogation of an Object for Dimensional and Topographical Information discloses a method of determining the dimensions of a human body using electromagnetic radiation in the frequency range of about 200 Megahertz (MHz) to about 1 Terahertz (THz). In a most preferred form, this reference discloses a range of about 5 Gigahertz (GHz) to about 110 GHz.

Scanning systems such as this transmit signals to a human target only a few feet away from a an array of transmitting and receiving elements. Accordingly, signal levels are very low to avoid unhealthy radiation exposure. An ultra-wide frequency scan is desirable to obtain target topography definition that is unavailable at lower bandwidths. Operation of such systems is also designed to be swift such that the human target does not have to remain motionless for an extended period of time. Thus, scan times generally need to be under a minute in length for comfort of the human target. Accordingly, a continuous and rapid sweep of the ultra-wide bandwidth frequency set is needed as the array of transmitting and receiving elements are moved around the individual being scanned. Such ultra-wideband scanning transceivers generally exhibit a non-uniform gain in the frequency response characteristics across the frequency band of interest.

In typical communication systems, narrow band transmission techniques are used which can avoid excessive frequency response non-uniformity. For example, in narrow band systems requiring only a few MHz in bandwidth, it is relatively easy to tune the high frequency components to achieve optimum linearity performance. There, the required bandwidth allows operation across a frequency range where the frequency response of the transmitter or receiver components are more closely related and component tolerances are controllable. However in an ultra-wideband system (e.g. 5 GHz or more) tuning the frequency response of the system to be optimal is a much more challenging task because of the inherent variation of the system components over the ultra-wide frequency range. All components show some amount of gain variation when used over a wide bandwidth. But, in the ultra-wide bandwidth systems, the gain variation in the components over the frequency range can be severe. For example, the semiconductor components, cabling and antennas that are used in the total system can have gain variation in excess of 20 dB. This variation reflects directly on the signal to noise quality of the system. Not only is the gain variation substantial, it can occur in a relatively small region of the overall bandwidth of the system. For example, component and connection gain variations as much as 20 dB can easily be encountered in measured bandwidths as small as 0.2 GHz.

A system of cascaded narrow band transceivers multiplexed into the transceiver elements could be used to address the ultra-wideband gain uniformity issues addressed above. But, the solution is undesirable in terms of cost and complexity in transceiver equipment and the difficulty in mapping different bandwidth variations into useable acquisition results for post-processing of data. Accordingly, a gain compensation mechanism is desirable to allow the use of a single transceiver to system to sweep an ultra-wideband system across its full frequency range while maintaining a reasonable and predictable transmit and receive signal level across the entire spectrum of interest.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to an aspect of the invention, a gain compensation system is used in a multi-Gigahertz bandwidth system which measures parameters of a human individual. The gain compensation scheme involves a circuit that controls the output a gigahertz mixer by controlling the level of the intermediate frequency (IF) input amplitude of the gigahertz mixer. In one embodiment, the amplitude level of the IF input to the gigahertz mixer is the result of an analog multiplier. One input of the analog multiplier receives a fixed level IF signal and the other multiplier input receives a gain control signal. The circuit operates by sending gain values stored in a memory to a digital-to-analog (D/A) converter. The analog output of the D/A converter is the gain control signal sent to the analog multiplier.

The gain control values are obtained by measuring the uncompensated frequency response of the ultra-wideband transceiver when a flat, stationary target is presented to the combination transmit/receive antenna array. The overall system frequency response is obtained from transmitter through to the final receiver and mixer down to the baseband output of a quadrature receiver. A table of this complete frequency response is created representing the amplitude response of the uncompensated system. A corresponding inverse and scaled table is then generated representing the gain compensated values. These values may be stored in the gain table. When utilized, the gain table dramatically improves the flatness of the system response over the desired bandwidth of the system. Other features of the invention will be evident from the following detailed description of the preferred embodiments.

DETAILED DESCRIPTION OF ILLUSTRATIVE EMBODIMENTS

Figure 1:
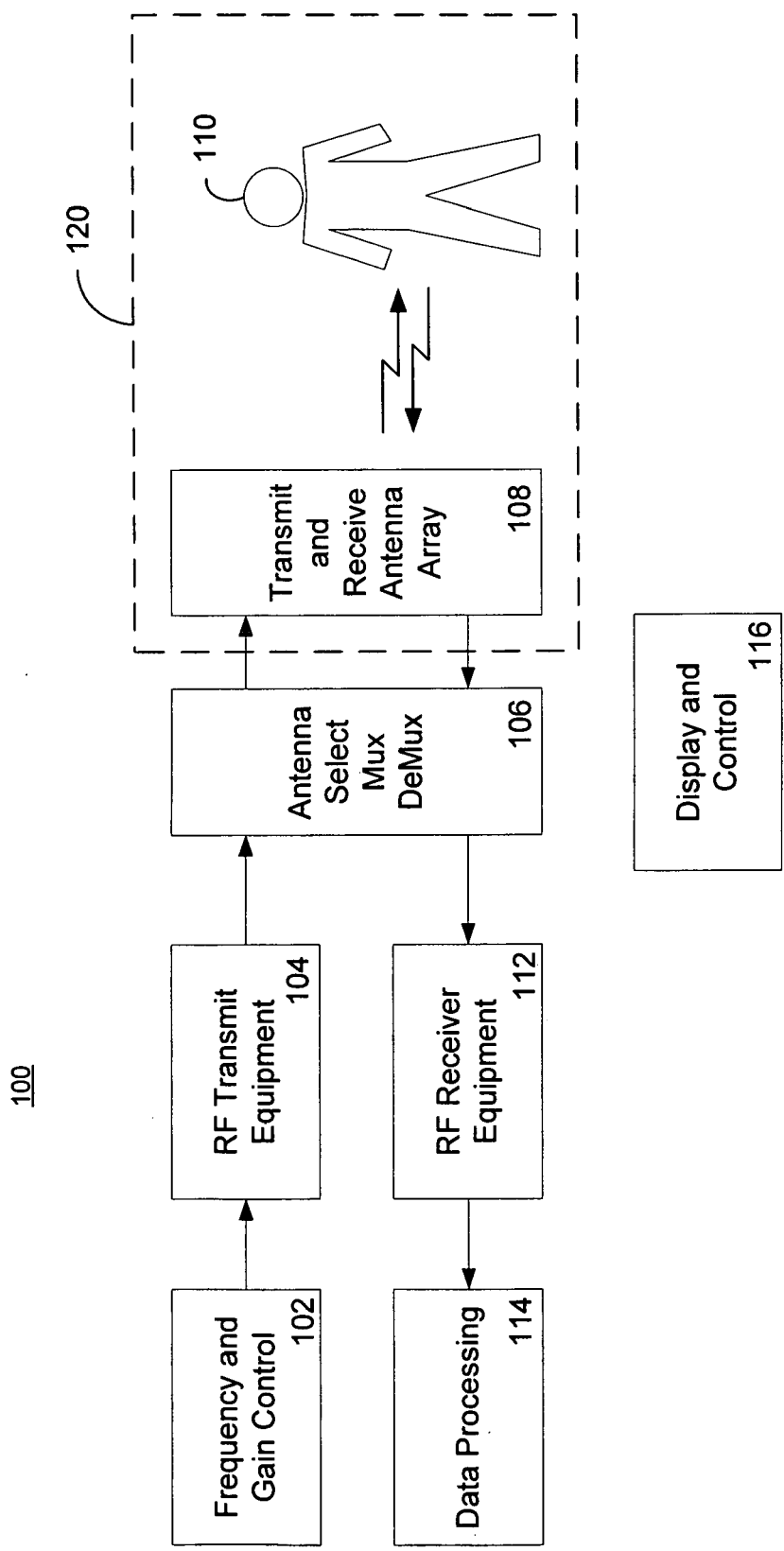
FIG. 1 is a functional block diagram of an example ultra-wideband system used for measuring the form of an individual.

FIG. 1 depicts an example ultra-wideband system 100. Although many applications of an ultra-wideband system are possible, FIG. 1 depicts a system for the measurement of physical characteristics of an individual. This specific example system 100 acquires data representative of reflections of electromotive (EM) energy from an individuals' body. The system includes an area 120 where an individual 110 would stand while low level EM energy is transmitted, reflected off the individuals body, and received. However, it will be noted that aspects of the invention may be used in any suitable ultra-wideband system.

In one aspect of the invention, a frequency and gain control function 102 is used to control the level of RF energy used to feed the transmission equipment 104. The function of the frequency and gain control is to provide gain compensation over the wide bandwidth of the ultra-wideband system 100. Without such a gain compensation function, the amplitude of the transmit antenna array and other components 108 would fall off sharply as the frequency of the ultra-wideband sweep increased. The system 100 operates by transmitting across an ultra-wideband of frequencies in a multiple sweeps or "chirps". The chirps or sweeps are performed periodically as the array is moved over the stationary individual. An antenna multiplexer 106 selects a transmit and receive antenna pair that transmits and receives the sweep of frequencies within the chirp.

Variations in the received signal correspond to the distance of the "reflective" portions of the individuals body from the antenna array 108. Reflected signals are received by the receive portion of the antenna array 108, are demultiplexed 106 and processed by the RF receiver equipment 112. Variations in the received signals are then processed, either in real-time or by post processing 114 to derive a three dimensional image of the individual 110.

In one example embodiment, a sweep may occur over the frequency range of 9.5 to 17.5 GHz. This sweep is chirped in a burst in less than 30 microseconds and is repeated continuously as the array is moved around the individuals body to map the reflections of the individual as seen in a 360 degree rotation.

If the gain of the transmit chirp is not naturally gain-uniform because the frequency response or tuning of the system components is not linear over the entire chirp frequency range. The decreasing amplitude response of the system as the each chirp reaches higher frequencies would result in loss of reflected signal from the individuals body, thus resulting in reflective data loss at higher frequencies. Thus, gain compensation of the ultra-wideband system 100 is most desirable.

Figure 2:
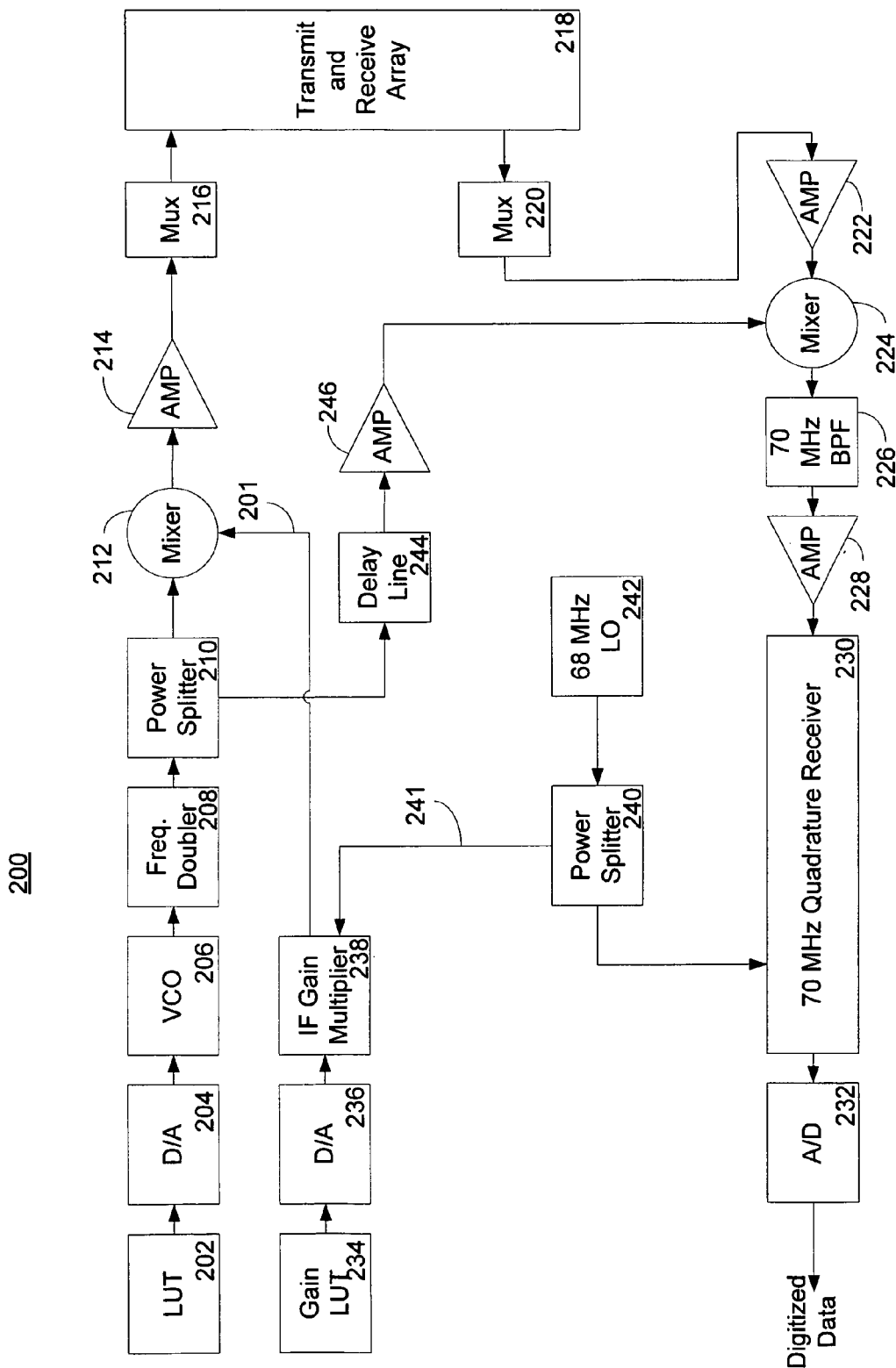
FIG. 2 is block diagram of an example ultra-wideband system transceiver.

FIG. 2 is a block diagram of an example ultra-wideband system 200 configured to accommodate the gain compensation needs of FIG. 1. Briefly the system 200 controls the gain of the intermediate frequency (IF) signal input to mixer 212 to control the gain of a the transmit signal across the ultra-wideband frequency range of each chirp produced by the system.

The transmission portion of the system 200 includes a look up table (LUT) 202 to control a digital to analog (D/A) converter 204 which exercises a voltage controlled oscillator (VCO) 206. The VCO 206 is used to generate the sweep of frequencies needed for the ultra-wideband system chirp. Voltage controlled oscillators have analog inputs and may be nonlinear in their voltage to frequency conversion. Accordingly, swept frequencies are controlled by varying the analog input. In the example system 200, the linearity of the VCO 206 may be controlled by the look up table supplying digital control values to the D/A converter 204 corresponding to the frequency ramp desired. In one embodiment of the system 200, the VCO 206 may be controlled by the D/A converter to produce a frequency range of 4.75 GHz to 8.75 GHz. Accordingly, a frequency doubler 208 is used to bring up the chirp frequency sweep up to 9.5 GHz to 17.5 GHz. The sweep of frequencies enters a power splitter 210 to feed a mixer 212 and a feedback delay line 244.

The mixer 212 combines an IF signal and the sweep of frequencies emerging from the frequency doubler 208 via the splitter 210. In one aspect of the invention, the analog level of the IF input to the mixer 212 is varied to accommodate the falloff of frequency response of the RF elements of the system 200 as frequencies increase within a chirp. In one embodiment of the system 200, an IF frequency of 68 MHz is used as a local oscillator (LO) 242. The LO is used by both the transmitter portion of the transceiver system 200 and the receiver portion via a power splitter 240.

Considering the LO signal that feeds the transmitting portion of the transceiver system 200, the LO signal 241 is used to feed a multiplier 238. In one aspect of the invention, the IF signal amplitude is varied by controlling a second input to the multiplier 238. This second input is a control voltage input varied by a look up table 234 providing digital input values for a D/A converter. Here, values of the look up table 234 are programmed to vary the magnitude of the control voltage input of the multiplier 238. The D/A converter 236 essentially provides a gain control input for the fixed-level 68 MHz LO. The output of the multiplier 241 is an IF signal whose magnitude is controlled via the look up table 234. The look up table is programmed to compensate for the high frequency drop in magnitude of the chirp signal. The output of the mixer 212 is a ultra-wideband frequency swept output with an output signal level which compensates for the non-uniform gain characteristic in the frequency response of the RF components of the transceiver system 200.

The ultra-wideband signal at the output of the mixer 212 is amplified 214 and routed via an element mux 216 to a transmit element in the transmit array 218. In operation, as depicted in FIG. 1, the ultra-wideband transmit wavefront is reflected off of the individual's body 110 and sensed by a selected receive element in the receive array. Returning to FIG. 2, a receive element in the receive array 218 collects the reflected signals. The collected signals are routed via mux 220 to an low noise amplifier 222 and are presented for downconversion. Mixer 224 combines the received signal from the low noise amplifier 222 and a copy of the ultra-wideband signal from amplifier 246 and produces an IF result. The copy of the ultra-wideband signal was obtained from the output of the frequency doubler via a power splitter 210. A delay line 244 is inserted in the system 200 so as to accommodate the travel time and distance that the ultra-wideband signal traverses to get to the mixer 224.

In one embodiment, the delay line provides an equivalent of 17 feet of signal delay so that a phase correlated downconversion of the received reflection signal may occur. A 70

MHz bandpass filter 226 is employed to filter out the unwanted mixer products and the result is amplified 228 before being provided to a 70 MHz quadrature receiver 230. I and Q channels may be extracted and provided to an A/D converter 232 so that the digitized data can be processed.

In one aspect of the invention, a calibration of the gain of the ultra-wideband signal over the frequency range of one chirp is made. In one embodiment, a system calibration is performed after the initial build and prior to use as a human body profiler. The calibration data may be provided into RAM memory which drives the D/A converter 236 used to modulate the gain of the IF multiplier 238. In brief, the calibration includes supplying the gain curve with a flat (DC) table of approximated 25% of full RF power. The overall system response is obtained, from the transmitter 214 through to the final receiver and mixer down to the baseband I and Q signal output of the 70 MHz quadrature receiver 230. The complete response of the system over the ultra-wide bandwidth is characterized and a table is created representing the amplitude response of the system. An inverse table of the amplitude information is then stored in the look up table 234 that drives the D/A converter 236. The gain calibration compensates for the falloff of gain at the high frequencies of the chirp and dramatically improves the flatness of the system response over the entire desired bandwidth of the system.

Figure 3:
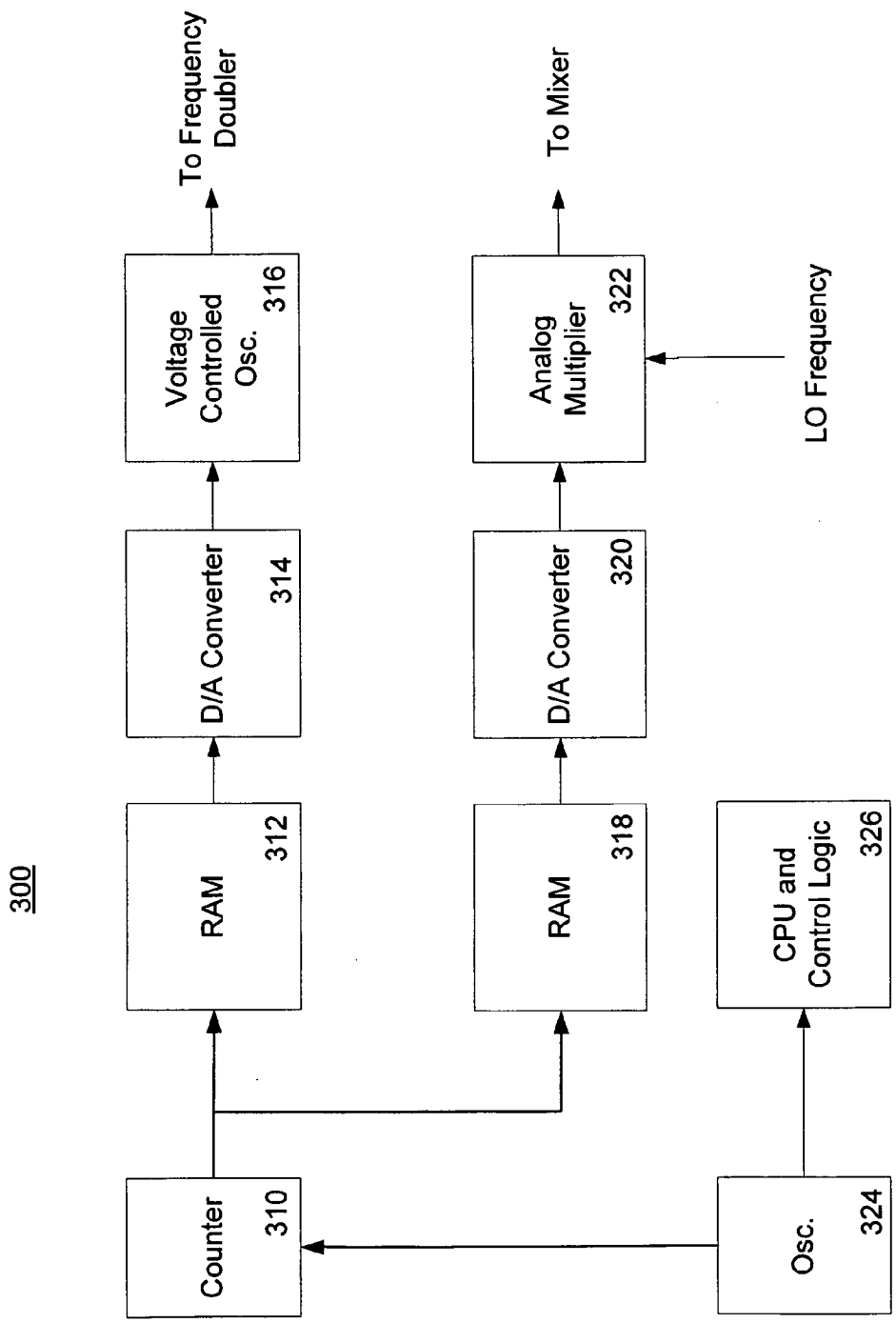
FIG. 3 is a block diagram of a circuit embodiment having aspects of the invention.

FIG. 3 is an example embodiment of the gain compensation mechanism 300 of the present invention. A digital counter 310 is driven by a clock oscillator 324 to provide a ramp of digital counts useful as an address for memory. RAM 312 is used as a look up table corresponding to the LUT 202 of FIG. 2. RAM 312 provides the linearity compensation for the voltage controlled oscillator 316 which drive the frequency doubler 208. The counter simultaneously provides an address reference to RAM 318 which contains the gain compensation look up table. The RAM 318 drives the D/A converter 320 to provide an analog input to the four quadrant multiplier 322. This analog multiplier also inputs the fixed-level LO frequency so that the output of the multiplier is a controlled level LO output to drive the ultra-wideband mixer previously discussed. In one embodiment, the single synchronous counter can provide the same address information to control the responses of both the voltage controlled oscillator 316 as well as the analog multiplier 322. Thus, the swept frequency and the gain compensation are synchronized. A CPU and control logic 326 provides the overall timing and event control for the gain compensation circuitry 300 as well as the rest of the system 200.

In one aspect of the invention, the gain compensation mechanism accommodates normal variations in the build of the ultra-wideband system that affects frequency response. The goal is to obtain an ultra-wideband transmission signal that has a nearly uniform or flat gain characteristic across the entire frequency sweep of the chirp. The flatness or improved uniformity of the gain characteristic in the frequency response of the system components may be measured by examining the I and/or Q channels of the 70 MHz quadrature receiver. During such a frequency response measurement, the human target is replaced with a flat panel reflector. Using a flat, known reflectivity target removes signal length, attenuation variation, and shape variations from affecting both the amplitude and phase response of the system.

Figure 4A:
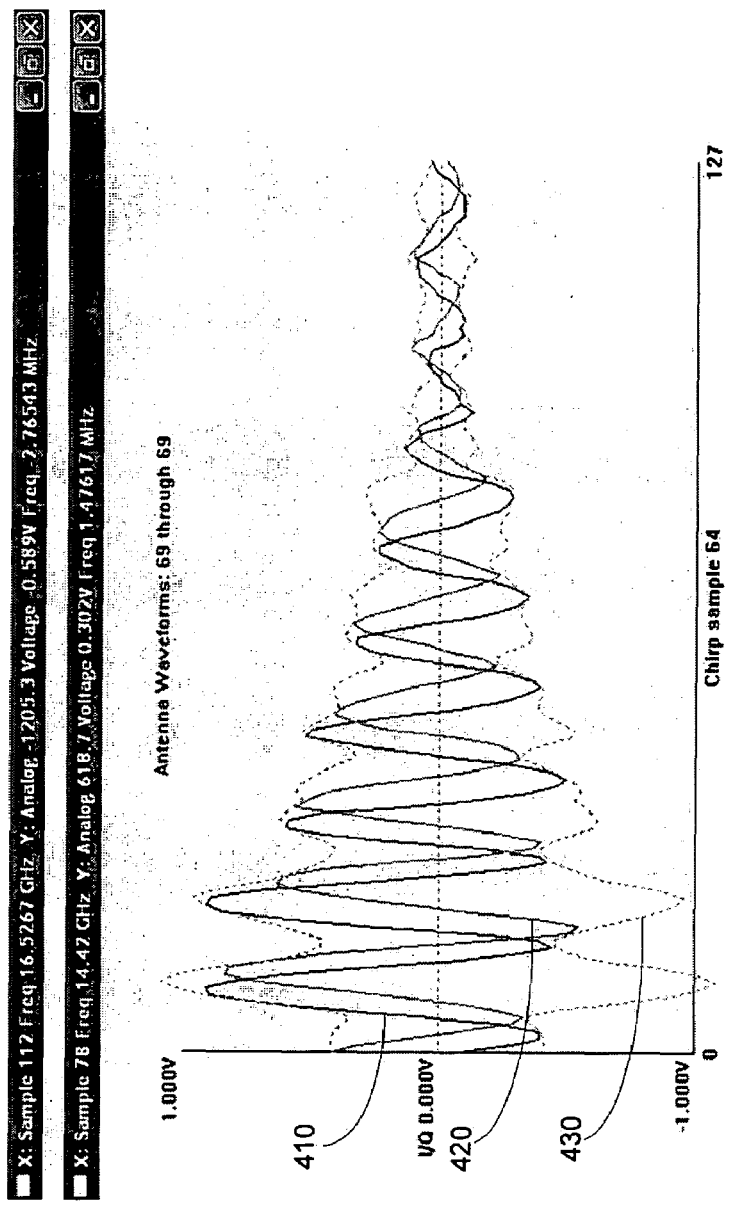
FIG. 4a graphically depicts the frequency response of an uncompensated system.

FIG. 4a is an example depiction of a frequency response of the system after VCO 316 calibration but before gain compensation. The FIG. 4a response is indicative of the frequency response of the system viewing a single chirp against a flat and stationary calibration target. The I channel response 410 indicates that there is a notable amplitude fall-off as frequency increases in the chirp sweep. The Q channel response 420 would be similar but have a 90 degree phase shift. Thus, the non-uniform gain characteristic of the uncompensated system make it more difficult to extract useful reflection information from all frequency portions of the chirp. The uncompensated power level 430 is calculated as SQRT $(I^2+Q^2)$.

Figure 4B:
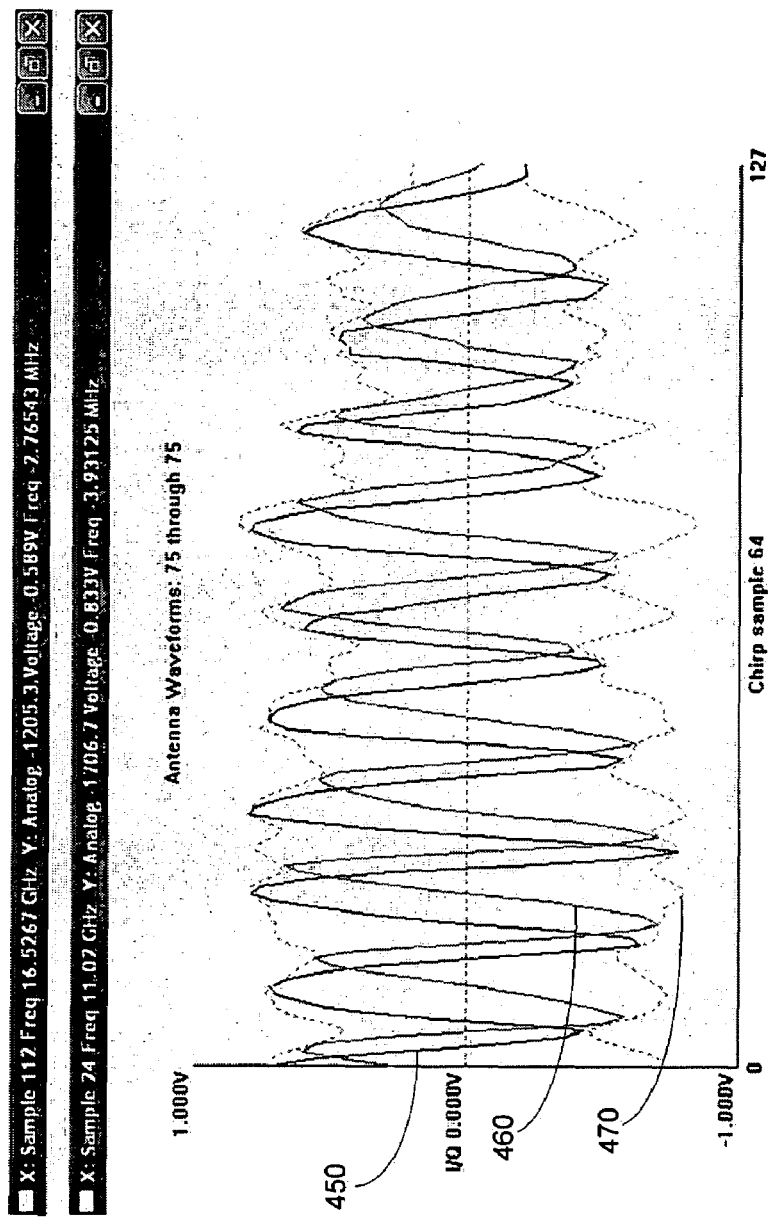
FIG. 4b graphically depicts the frequency response of a compensated system.

FIG. 4b depicts the same system configuration after gain compensation. Here, RAM 318 was loaded with values commensurate with an increased gain across the frequency sweep of the chirp. The I channel result 450 after compensation indicates a more uniform gain response across the frequency sweep of a single chirp. The corresponding Q channel result 460 is similar with a 90 degree phase shift. The compensated power level 470 is calculated as SQRT $(I^2+Q^2)$. The more stable and flat the frequency response, the easier it is to extract frequency and amplitude variations which correspond to contours of the target.

Although the FIG. 4b response is only an example of the calibration results, an ideal compensation would result in a fixed frequency of perfectly uniform amplitude across the entire sweep of the chirp. In the case of a flat and stationary calibration target, the frequency of the FIG. 4b I channel results 450 would ideally be fixed corresponding to the difference in frequency between the transmit wavefront and the receive wavefront as received at the mixer in the receiver chain. Ideally, the FIG. 4b response should also have perfectly uniform amplitude because there should be no difference in attenuation of the calibrated system over the full frequency sweep within the chirp. However, the empirical results shown in FIG. 4b of the gain compensation mechanism are a dramatic and valuable improvement in gain flatness over the uncompensated response of FIG. 4a. This improvement in flatness of the gain characteristic, producing a substantially uniform gain over the sweep, enables post-processing of all of the frequency portions of the sweep, including the normally lower high frequency portions.

Figure 5:
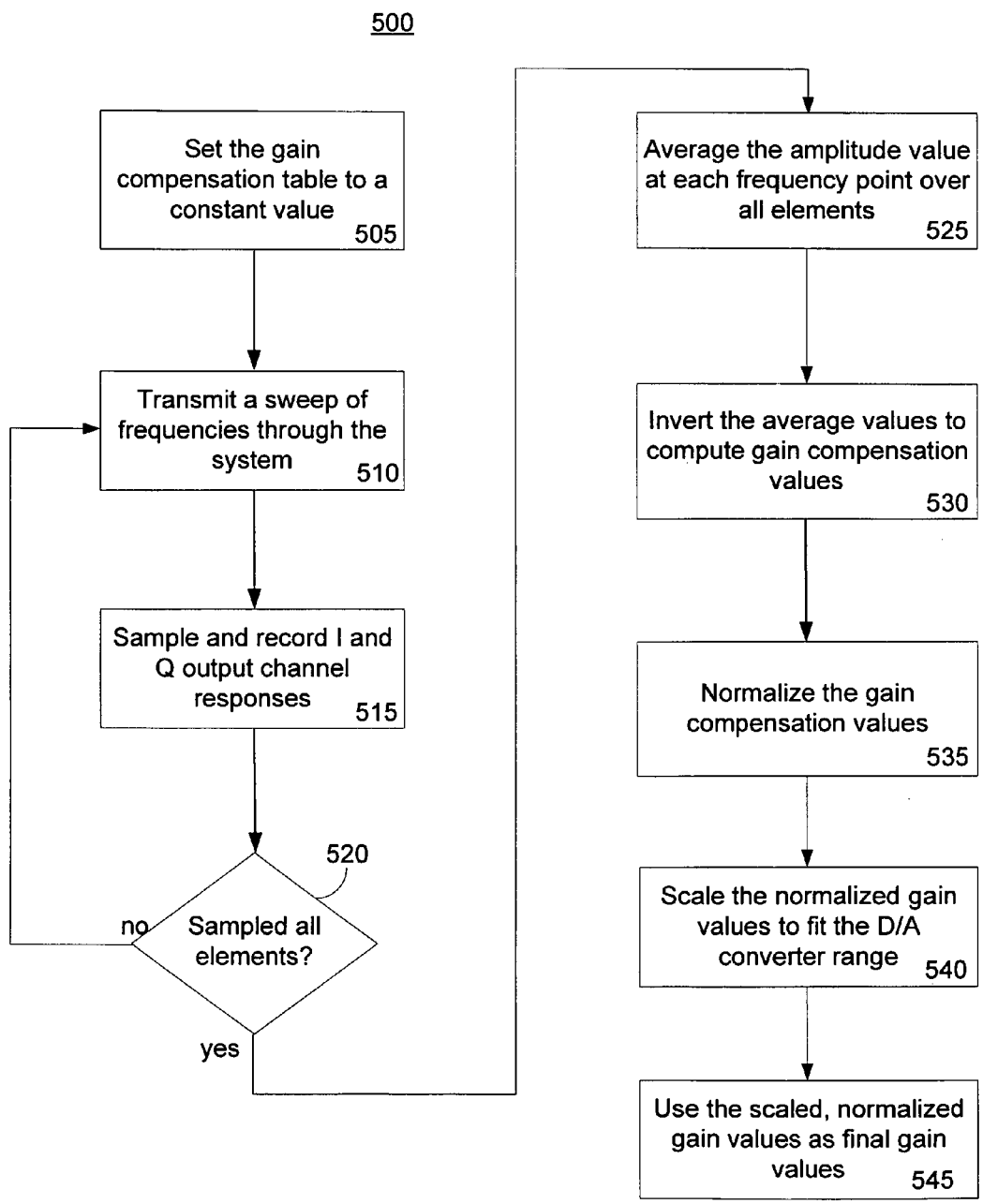
FIG. 5 is a flow diagram of a method having aspects of the invention.

Generation of the gain compensation tables may be generated using a computer running software for processing data received from an uncompensated frequency response of the ultra-wideband system. FIG. 5 is a flow diagram of an example method of generating gain compensation values for the present invention. Initially, an ultra-wideband system is built and a flat stationary target is placed in front of the transmit and receive antenna element array. The gain compensation table or gains compensation values are set to a constant level (step 505). The transmitter is swept across the multiple gigahertz bandwidth (step 510). The transmitter is swept using a first transmit and receiver element pair. During the sweep, in-phase (I) and quadrature phase (Q) responses are sampled and recorded (step 515). In one embodiment, 128 samples across the bandwidth are measured for each chirp or frequency sweep of the system.

If all of the antenna elements have not been swept (step 520) then steps 510 and 515 are repeated after selecting a next transmit and receive antenna element pair until all transmit and receive element pairs have been exercised. In one embodiment, 192 elements pairs are sampled. If all elements have been exercised, then the average amplitude value at each frequency point is calculated for all elements (step 525). In one embodiment, the I and Q channel sample values are each squared and added to determine the effective power of the detected reflection signal. The average value for each frequency point is then inverted to compute the rough gain compensation value (step 530). The rough gain compensation values are normalized to produce a uniform set of gain compensation values (step 535). The normalized gain values are then scaled to fit the D/A converter dynamic range (step 540). In one embodiment, the dynamic range may be 8 bits. The normalized and scaled gain values may then be loaded into the gain compensation tables (step 545). The ultra-wideband transceiver can now operate in a gain compensated mode. As a result, the I, Q, or power combination of both channels appears to be substantially uniform over the frequency range of the sweep or chirp.

Figure 6:
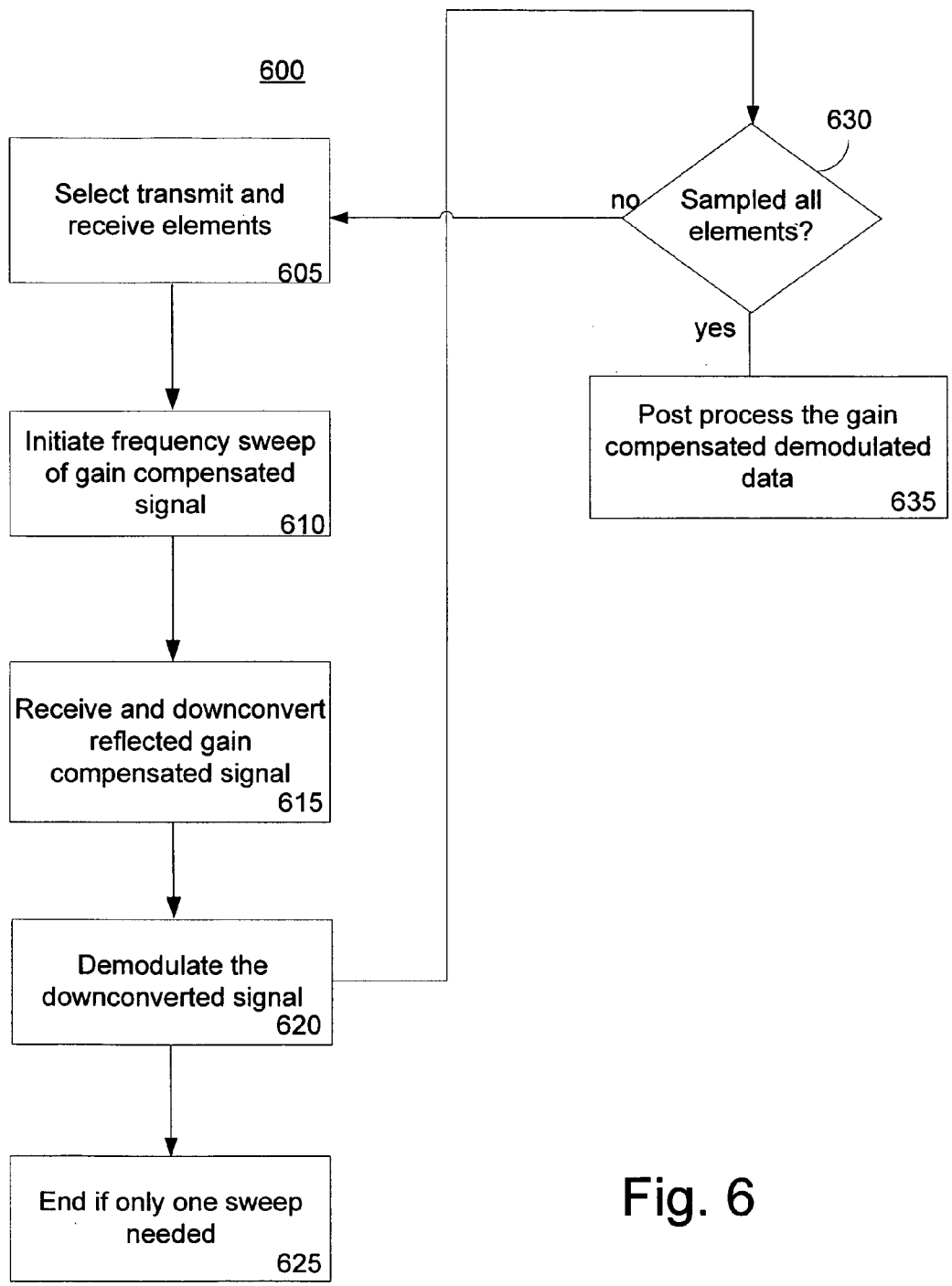
FIG. 6 is a flow diagram of a method which controls an ultra-wideband system.

FIG. 6 is a flow diagram showing a method 600 having aspects of the current invention. The method 600 controls an ultra-wideband system for the measurement of an individual using a gain compensated ultra-wideband frequency transmission scheme. Initially, a first transmit and receive antenna array having a plurality of element pairs is selected (step 605). A sweep of a gain compensated ultra-wideband frequency band is initiated (step 610). Simultaneous with the sweep, a reflected signal of the gain compensated ultra-wideband frequency band signal is received and downconverted (step 615). The downconverted signal is demodulated (step 620).

The process may end (step 625) if only one sweep of the system is needed. However, in operation, some systems will require multiple sweeps and post processing of the results. For example, if a sweep of each antenna element receive and transmit pair is desired, then the process determines if all of the antenna elements have been sampled (step 630). If not, then steps 605-620 are repeated for the next antenna element pair. If all antenna elements have been sampled, then post-processing of the gain compensated demodulated data may be accomplished (step 635). This post processing includes extracting measurements of an individuals body from the demodulated data.

It will be apparent to those skilled in the art that various modifications and variations may be made in the apparatus and method of the present invention without departing from the spirit or scope of the invention. For example, the gain compensation scheme may be implemented in any multi-gigahertz transceiver. Thus, it is intended that the present invention encompass modifications and variations of this scheme provided those modifications and variations come within the scope of the appended claims and equivalents thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A circuit for providing gain compensation of a swept frequency response in an ultra-wideband system, the circuit comprising:
    a multiplier receiving a first input signal comprising a fixed-level intermediate frequency (IF) signal and a second input signal comprising a gain control signal, the multiplier providing a variable amplitude IF signal output;
    a mixer coupled to the multiplier signal output, the mixer producing a variable amplitude ultra-wideband output signal derived from the variable amplitude IF signal and a swept frequency signal;
    a digital-to-analog converter providing the gain control signal to the multiplier; and
    a memory containing gain values, the gain values controlling the digital-to-analog converter, wherein the gain values compensate for amplitude variations of a swept frequency response of the ultra-wideband system.

2. The circuit of claim 1, wherein the ultra-wideband system has a bandwidth of about 5 GHz or greater.

3. The circuit of claim 1, further comprising:
    a voltage controlled oscillator (VCO) providing the swept frequency signal;
    a second digital-to-analog converter coupled to the VCO providing frequency control for the VCO; and
    a memory containing frequency control values, the frequency control values controlling the second digital-to-analog converter, wherein the frequency control values compensate for frequency variations of the swept frequency signal.

4. The circuit of claim 3, further comprising:
    a counter coupled to the memory containing gain values and the memory containing frequency control values wherein the swept frequency signal produced by the VCO and the variable amplitude IF signal are synchronized.

5. The circuit of claim 1, further comprising a counter, driven by control logic, that changes addresses to the memory containing gain values such that a gain compensation value corresponds to each change in frequency in the swept frequency signal.

6. The circuit of claim 1, where the multiplier is a four quadrant analog multiplier, and the mixer accommodates a swept frequency signal of 5 GHz or greater.

7. The circuit of claim 1, wherein the swept frequency signal comprises a chirp of about 5 GHz or greater.

8. A system for scanning an individual using an ultra-wideband transceiver, the system comprising:
    a transmit and receive antenna array, the antenna array emitting a gain compensated ultra-wideband sweep signal from a transmit element and receiving a reflected signal on a corresponding receive element;
    an ultra-wideband transmitter chain comprising an ultra-wideband frequency source, a controllable amplitude intermediate frequency (IF) source, and a mixer which outputs the gain compensated ultra-wideband sweep signal;
    an ultra-wideband receiver chain, the receiver chain comprising a low noise amplifier, a downconverter, and a quadrature receiver;
    wherein the gain compensated ultra-wideband sweep signal is derived by varying the controllable amplitude IF source into the mixer, and wherein the gain compensated ultra-wideband sweep signal compensates for frequency response amplitude variations across a frequency sweep of the system such that a substantially uniform amplitude signal at an output of the quadrature receiver is acquired if a flat target is presented to the antenna array.

9. The system of claim 8, wherein the ultra-wideband frequency source produces a chirp of about 5 GHz or greater.

10. The system of claim 8, further comprising an antenna selection mechanism which selects transmit and receive element pairs for each ultra-wideband frequency sweep.

11. The system of claim 8, wherein the controllable amplitude IF source comprises:
    a multiplier receiving a first input signal comprising a fixed-level IF signal and a second input signal comprising a gain control signal, the multiplier producing a variable amplitude IF signal output;

a digital-to-analog converter providing the gain control signal to the multiplier; and a memory containing gain values, the gain values controlling the digital-to-analog converter.

12. The system of claim 11, wherein the gain values are acquired by inverting, normalizing, and scaling samples of a sweep of an uncompensated transceiver acquired when the flat target is presented to the antenna array.

13. The system of claim 8, wherein the downconverter comprises:

a mixer receiving a signal reflected from the flat target and a delayed signal copy of the ultra-wideband frequency source, the mixer producing an intermediate frequency signal product; and an intermediate bandpass filter to pass the intermediate signal product.

14. The system of claim 8, wherein the quadrature receiver output comprises at least one of an in-phase (I) channel and a quadrature-phase (Q) channel.

15. A method of controlling an ultra-wideband transceiver in a system which determines physical measurements of an individual, the method comprising:

selecting a transmit and receive element pair of the antenna array;

initiating a frequency sweep of an individual via a transmit antenna array, the sweep comprising emission of a gain compensated ultra-wideband transmit signal generated using a variable amplitude intermediate frequency (IF) signal mixed with a fixed amplitude ultra-wideband sweep signal;

receiving and downconverting a signal reflected off of the individual;

demodulating the downconverted signal;

wherein the gain compensated ultra-wideband transmit signal compensates for frequency response amplitude variations across the frequency sweep of the system such that a substantially uniform amplitude signal measured at the demodulated signal.

16. The method of claim 15, wherein selecting a transmit and receive element pair of the antenna array comprises selecting a multiplexer coupled to the antenna array which routes transmit energy to a transmit element and selects reflected energy received on a receive element.

17. The method of claim 15, wherein initiating a frequency sweep further comprises activating a counter mechanism to provide addresses to a first memory, the first memory storing gain compensation values useful to control a digital-to-analog converter generating the variable amplitude IF signal.

18. The method of claim 17, wherein the gain compensation values are obtained by inverting, normalizing, and scaling an uncompensated frequency response of the system when presented with a flat reference target.

19. The method of claim 17, wherein the counter further provides addresses to a second memory, the second memory storing frequency compensation values useful to control a digital-to-analog converter generating the frequency sweep via a voltage controlled oscillator.

20. The method of claim 14, wherein downconverting a signal reflected off of the individual comprises using a mixer and a delayed version of a signal comprising the frequency sweep with the reflected signal to produce an intermediate frequency reflected signal.

21. A method of calibrating an ultra-wideband transceiver for a uniform gain response in a system which determines physical measurements of an individual, the method comprising:

setting a gain control table to a fixed value, wherein the gain control table is used to control the gain of an intermediate frequency signal into a mixer whose output generates an ultra-wideband frequency sweep;

transmitting the ultra-wideband frequency sweep through the system, the system having a flat target;

measuring and recording demodulated output signal levels over the sweep, wherein a plurality of sweeps are transmitted, measured and recorded;

averaging the demodulated output signal levels for a plurality of frequencies over the plurality of sweeps to obtain average values for each of the plurality of frequencies;

inverting the average values to compute gain control values;

normalizing the gain control values; and loading the normalized values in the gain control table, wherein the normalized values provide gain compensation to the intermediate frequency signal into the mixer, whereby a gain compensated ultra-wideband sweep signal is produced.

22. The method of claim 21, wherein normalizing the gain control values further comprises scaling the normalized values to accommodate a dynamic range of the system.

* * * * *